Patented July 26, 1938

2,125,189

UNITED STATES PATENT OFFICE 2,125,189

METHOD FOR THE PURIFICATION AND SEPARATION OF ARYL SULPHONIC ACIDS

William M. Lofton, Jr., Chicora, Jennings H. Jones and Arthur K. Pyle, Petrolia, and Alvin A. Hoffmann, Bellevue, Pa., assignors to Pennsylvania Coal Products Company, Petrolia, Pa., a corporation of Pennsylvania No Drawing. Application September 9, 1936, Serial No. 100,032

13 Claims. (Cl. 260—159)

The present invention relates to an improved method for the purification and separation of aryl sulphonic acids.

One of the objects of this invention is to separate sulphonic acids in pure form from reaction mixtures.

A further object of the invention is to greatly increase the yield of pure sulphonic acids obtained from reaction mixtures.

A still further object of the invention is to prevent the hydration of sulphonic acids undergoing filtration and thereby prevent losses.

Still another object of the invention is to enable crystallized sulphonic acids to be more easily separated, as by filtration, from reaction mixtures and liquids.

Another object of the invention is to prepare pure sulphonic acids for further reactions, such as benzene meta di-sulphonic acid for fusion with caustic alkalies in the manufacture of resorcin.

It has heretofore been the custom in preparing a sulphonation mixture for fusion with caustic alkalies, or mixtures thereof, to treat the mixture of sulphonic acids and excess mineral acid present with lime, or other alkaline substances. Usually alkaline substances are selected which form insoluble sulphates and soluble sulphonates. In such cases, the sulphates are filtered from the soluble sulphonates. The next step usually consists of forming the alkali salt of the sulphonic acid, or mixtures thereof, by treating with alkali carbonate, or like substances whereby most of the calcium is precipitated as a more or less insoluble salt. This leaves the alkali sulphonate in solution. The water is then evaporated off by usual, suitable well known methods and the alkali salt melted with caustic alkali, whereby a reaction takes place involving the elimination of the sulphonic acid group, or groups, and its replacement with the hydroxyl group, or groups. It is, of course, understood that it is the salt of the sulphonic acid group, as used in the reaction, that is being displaced by the alkali salt of the hydroxyl group, and that the compound containing the free hydroxyl group is obtained upon acidifying the fusion mass.

It has also been known in the preparation of sulphonic acids, and particularly the aryl sulphonic acids, that in certain cases the sulphonation mixture containing the sulphonic acid can be cooled and diluted by means of ice in order to aid in the separation of the sulphonic acid.

It has been discovered that a great saving in the separation of sulphonic acid may be effected if there is added to the sulphonation mixture a quantity of sulphuric acid, or other suitable liquid, such as chlor sulphonic acid, in order to give sufficient fluidity to the crystallizing mixture and facilitate the filtering operation and purification of the resultant product. This is particularly applicable to sulphonic acids of highly hygroscopic nature, since otherwise these sulphonic acids are not readily separated in high yield from water mixtures. Instead of sulphuric acid, or chlor sulphonic acid, sulphuric acid in highly concentrated form is preferably used, such as oleum. When sulphuric acid or chlor sulphonic acid is used, greater yields of the sulphonic acids are obtained. In some instances the added liquid can be water. This is applicable when the sulphonic acid to be separated is insoluble in water at low temperatures.

If the sulphonation mixture is cooled prior to adding thereto the sulphuric acid, or other suitable liquid, it is advisable to triturate the crystallized material with sulphuric acid, or the other suitable liquid. This results in breaking up the crystals and enables the other added liquid to better dissolve the impurities present, and the separation from these impurities is, therefore, more easily effected upon filtration. Preferably, however, the liquid is added in a suitable amount to the sulphonation mixture, and the mixture is then cooled to some desired lower temperature. This temperature is, preferably, as low as possible, since the sulphonic acids in general decrease in solubility with low temperatures. The temperature should not be so low, however, that freezing occurs. The temperature to which the mixtures are cooled varies with the various aryl sulphonic acids to be separated. During this cooling, the mixture may be agitated by some suitable means whereby smaller crystals are produced. The production of small crystals is advisable, since it prevents the inclusion of impurities. The cooled slurry is then filtered, or centrifuged, or separated in some other suitable fashion. During the filtration or separation, it is highly advisable to prevent moisture from contact with the sulphonic acids or mixtures thereof. In case a pressure or vacuum filter is used, the air coming in contact with the filtered crystals should be dried. The sulphonic acids, in general, are highly hygroscopic and their great affinity for moisture causes them to remove moisture from the air with which they are in contact, unless this air is dried. If this occurs during filtration, losses of sulphonic acid will result due to a portion of the sulphonic acids dissolving in the water removed from the moist air. The air coming in in any well known manner, as by passing through concentrated sulphuric acid, or other suitable means.

In carrying out the method in a practical manner, it has been found advisable, but not necessary, to proceed according to the following preferred examples, in which all the proportions are given in parts by weight:

Example I 2,710 parts of so-called mixed acid, i. e., a mixture consisting essentially of benzene meta disulphonic acid together with excess sulphuric acid, is allowed to cool until the benzene meta disulphonic acid is largely crystallized out. 250 parts of sulphuric acid of 66° Baumé strength is then added. The mixed acid and sulphuric acid are triturated together, and the crystals broken up. The slurry is then vacuum filtered. After the bulk of the liquid present is removed, the crystals are washed with an additional portion of cold sulphuric acid. A suction filter is preferably used, and all the air or other gas coming in contact with the crystals is preferably dried. The drying of the air may be accomplished by drawing it through any suitable dehydrating agent, such as anhydrous calcium chloride, or strong sulphuric acid. A yield of 915 parts of benzene meta disulphonic acid of high purity is obtained.

Example II 200 parts of mixed acid are mixed with 100 parts of sulphuric acid of 66° Baumé strength. The mixture is heated to approximately 100° C., or until the mixed acid is dissolved in the sulphuric acid. The solution is then cooled to 15° C., being stirred during the cooling operation. Crystals of benzene meta disulphonic acid will be precipitated. These crystals are filtered in a manner similar to that described in Example I. A good yield of sulphonic acid of a purity exceeding 80% is obtained.

Example III

As in Example I mixed acid, which is cooled to a point where substantially all the benzene meta disulphonic acid has been crystallized, is triturated with sulphuric acid of 66° Baumé strength. It is then filtered as in Example I, and thereafter washed with one or more small portions of a mixture of benzene and alcohol containing approximately 50% benzene, and again filtered. The wash liquor is substantially all removed by filtration whereupon the crystals of benzene meta disulphonic acid are obtained in greater purity, but in somewhat lower yields than in Example I.

Example IV 200 parts of mixed acid previously cooled, are mixed with 50 parts of sulphuric acid containing 20% sulphur trioxide. This acid is known commercially as 20% oleum. The mixture is triturated and then filtered. It is filtered by means of a tightly covered funnel, and all the air drawn through the suction filter is first passed through sulphuric acid containing an excess of sulphur trioxide, as for example 65% oleum, i. e., sulphuric acid containing 65% sulphur trioxide. After substantially all of the liquid is removed, the air entering the filtering device is further dried by passing it through, for example, anhydrous calcium chloride. By proceeding in this manner, any water of crystallization is substantially removed by the dry air passing through the sulphonic acid. The benzene meta disulphonic acid obtained is of good quality, and the yield exceeds 90% of the theoretical.

Example V 200 parts of mixed acid are treated with 50 parts of 65% oleum in the same manner as that followed in Example IV.

Example VI 200 parts of mixed acid, previously cooled, are triturated with 100 parts of sulphuric acid of 98% strength. The mixture is filtered by means of a tightly covered funnel, through which dry air is drawn. The air is drawn through the crystalline mass until substantially all the liquid is removed therefrom.

Example VII

Phenol is sulphonated by treatment with sulphuric acid at 100–110° C. This results in the almost exclusive sulphonation in the para position, forming para phenol sulphonic acid. The sulphonation mixture is cooled down to 5° C. while being stirred. Crystals of phenol sulphonic acid are obtained, and these are filtered under vacuum in a manner similar to that disclosed in the previous examples. The crystals are subjected to vacuum filtration, all the air passing through the crystals being dried, until substantially all the liquid is removed. Yields of more than 40% of the theoretical of almost pure sulphonic acid are obtained.

Example VIII

Para toluene sulphonic acid is prepared by sulphonating toluene in the well known manner. 475 parts of this sulphonation mixture, containing approximately 308 parts of para toluene sulphonic acid, were chilled to 25° C. The crystals were filtered in the same manner as that in the previous example. 275 parts of para toluene sulphonic acid were obtained.

Example IX

Benzene mono-sulphonic acid was prepared in the well known manner. 610 parts of the sulphonation mixture, containing approximately 405 parts of benzene mono-sulphonic acid, were cooled to −10° C. The separated sulphonic acid was filtered in a manner as described in the previous examples, the filtering device being cooled during the filtering operation. 100 parts of purified benzene sulphonic acid were obtained. If still greater purity of sulphonic acids is desired, it may be obtained by dissolving the purified sulphonic acid, after filtration, in pure sulphuric acid, since the sulphonic acids are soluble in hot sulphuric acid, although insoluble in cold sulphuric acid. Care must be exercised, however, to prevent further chemical action. After the sulphonic acids are dissolved in the sulphuric acids, the same methods of filtration as those already outlined may be used.

Example X

Naphthalene was sulphonated in such a manner that the alpha naphthalene sulphonic acid was formed. The sulphonation mixture was diluted with an equal amount of water, cooled to 5° C. and filtered. The alpha naphthalene sulphonic acid was obtained in yields exceeding 50% of theory.

Example XI

Beta naphthalene sulphonic acid was prepared in a well known manner. 100 parts of the sulphonation mixture was diluted with 63 parts of water. This mixture was cooled to 5° C. and filtered in the manner previously described. The beta naphthalene sulphonic acid was obtained in yields of 80% or greater.

It is obvious that certain minor variations may be made in the procedure, and these will be obvious to those skilled in the art. The procedure as disclosed should be considered merely as illustrative and not as limiting the scope of the invention. The sulphonic acids as thus prepared are pure, and may be used for a variety of purposes wherein such substances find applications. Such applications would naturally include reactions with caustic alkalies for production of phenols in cases in which other factors do not prohibit such use. The sulphonic acids also appear to be of particular value in electro-plating processes.

It will be readily apparent, since the sulphonic acids separated according to this improved method contain only a little sulphuric acid, that a very substantial saving is made in the amount of alkaline substances necessary to effect neutralization. Since the amount of sulphuric acid present is relatively low, it is obvious that the step of neutralizing the batch with lime, or similar substances, in the same group of elements may be dispensed with altogether in preparing the sulphonic acids for treatment with alkalies, or certain alkali salts, as well as in certain other reactions. For example, the benzene meta disulphonic acid may be separated in substantially pure form as previously described. If it is then desired to convert it into resorcin, the acid may be added directly to the alkali which is in suitable condition to effect the desired reaction, or more specifically, the benzene metal disulphonic acid may be added to the fused alkali, in such manner as to form resorcin. It is possible also to treat the benzene metal disulphonic acid with alkaline substances in such a manner as to produce meta phenol sulphonic acid salts from which the free acid may be obtained by proper treatment with acidic substances. Another way of making the alkali salt preparatory to treating with alkali hydroxides, would be to add the benzene metal disulphonic acid, for example, to a concentrated solution of sodium carbonate, containing an excess of sodium carbonate, the amounts of the sulphonic acid and sodium carbonate being so selected that after reaction the mixture is neutral. The excess water may be evaporated off, and the salt treated with alkali hydroxides or alkali salts, or other suitable substances.

What is claimed is:

1. A process for the separation of aryl sulphonic acids from impure mixtures thereof comprising adding an additional liquid in which the sulphonic acid is insoluble and the impurities are comparatively soluble at low temperatures thereto, mixing the resultant combined impure mixture and liquid, cooling the combined impure mixture to precipitate the aryl sulphonic acid therefrom and filtering the aryl sulphonic acid from the remainder of the mixture while maintaining the cooled mixture under dehydrating conditions.

2. A process for the separation of aryl sulphonic acids from impure mixtures thereof comprising adding concentrated sulphuric acid to the impure mixture, mixing the resultant combined impure mixture and sulphuric acid, cooling the combined impure mixture to precipitate the aryl sulphonic acid therefrom and filtering the aryl sulphonic acid from the remainder of the mixture while maintaining the cooled mixture under dehydrating conditions.

3. A process for the separation of aryl sulphonic acids from impure mixtures thereof comprising adding oleum thereto, thoroughly mixing the resultant combined impure mixture and oleum, cooling the combined impure mixture and oleum to precipitate the aryl sulphonic acid therefrom and filtering the aryl sulphonic acid from the remainder of the mixture.

4. A process for the separation of aryl sulphonic acids from impure mixtures thereof comprising adding oleum thereto, thoroughly mixing the resultant combined impure mixture and oleum, cooling the combined impure mixture and oleum to precipitate the aryl sulphonic acid therefrom and filtering the aryl sulphonic acid from the remainder of the mixture while maintaining the cooled mixture under dehydrating conditions.

5. A process for the separation of aryl sulphonic acids from impure mixtures thereof comprising cooling the sulphonated mixture to solidify the same, triturating the solidified material with a liquid in which the sulphonic acid is insoluble at low temperatures and in which the impurities are comparatively soluble and cooling the triturated mixture to precipitate the sulphonic acid therefrom and filtering the sulphonic acid from the cooled mixture.

6. A process for the separation of aryl sulphonic acids from impure mixtures thereof comprising cooling the impure mixture to crystallize the same, triturating the crystallized mixture with concentrated sulphuric acid, further cooling the triturated mixture and filtering the aryl sulphonic acid from the remainder of the cooled triturated mixture.

7. A process for the separation of aryl sulphonic acids from impure mixtures thereof comprising cooling the impure mixture to crystallize the same, triturating the crystallized mixture with concentrated sulphuric acid, further cooling the triturated mixture and filtering the aryl sulphonic acid from the remainder of the cooled triturated mixture while maintaining the cooled mixture under dehydrating conditions.

8. A process for the separation of aryl sulphonic acids from impure mixtures thereof comprising cooling the sulphonated mixture to solidify the same, triturating the solidified material with a liquid in which the sulphonic acid is insoluble at low temperatures and in which the impurities are comparatively soluble and cooling the triturated mixture to precipitate the sulphonic acid therefrom and filtering the sulphonic acid from the cooled mixture while maintaining the cooled mixture under dehydrating conditions.

9. A process for the separation of aryl sulphonic acids from impure mixtures thereof comprising adding an additional liquid in which the sulphonic acid is insoluble at low temperatures and in which the impurities are comparatively soluble thereto, cooling the combined impure mixture and liquid to precipitate aryl sulphonic acid therefrom and filtering the precipitated impure mixture under suction while drying the air or other gas supplied to the filter during the filtering operation.

10. A process for the separation and purification of aryl sulphonic acids from impure mixtures thereof comprising adding an additional liquid in which the sulphonic acid is insoluble and in which the impurities are comparatively soluble at low temperatures and the sulphonic acid is comparatively soluble at high temperatures thereto, heating the combined impure mixture and liquid to dissolve the aryl sulphonic acid therein, cooling the combined impure mixture and liquid to precipitate aryl sulphonic acid therefrom, and filtering the precipitated aryl sulphonic acid from the remainder of the mixture under suction while drying the air or other gas applied to the filter during the filtering operation.

11. A process for the separation of aryl sulphonic acids from impure mixtures thereof comprising cooling the impure mixture to precipitate impure aryl sulphonic acid therefrom, filtering the separated sulphonic acid, adding an additional liquid in which the sulphonic acid is insoluble and in which the impurities are comparatively soluble at a low temperature and the sulphonic acid is comparatively soluble at high temperatures thereto, mixing the liquid and acid together, heating the combined sulphonic acid and liquid to dissolve the sulphonic acid in the liquid, cooling the combined acid and liquid to precipitate the purified sulphonic acid, and filtering the purified sulphonic acid from the remainder of the liquid under suction while drying the air or other gas applied to the filter during the filtering operation.

12. A process for the separation of highly hygroscopic aryl sulphonic acids from impure mixtures thereof which comprises cooling the mixture to a temperature sufficient to solidify the same, adding oleum thereto, triturating the solidified mixture with the oleum to dissolve the impurities therein, cooling the triturated mixture to crystallize therefrom the purified sulphonic acid, and filtering the sulphonic acid crystals from the oleum solution under dehydrating conditions so as to prevent the crystals on the filtering medium from taking up water and passing through the filter in the water solution so generated.

13. In a process of purifying and separating hygroscopic aryl sulphonic acids from a slurry containing a mixture of precipitated sulphonic acid and a solution of impurities, the step comprising filtering the sulphonic acid from the slurry under dehydrating conditions.

WILLIAM M. LOFTON, JR.
JENNINGS H. JONES.
ARTHUR K. PYLE.
ALVIN A. HOFFMANN